May 11, 1954 B. D. LOUGHLIN 2,678,389

SIGNAL-TRANSLATING SYSTEM FOR TELEVISION RECEIVERS

Filed Aug. 14, 1950 3 Sheets-Sheet 1

INVENTOR.
BERNARD D. LOUGHLIN

BY Lawrence B. Dodds

ATTORNEY

SIGNAL-TRANSLATING SYSTEM FOR TELEVISION RECEIVERS

Filed Aug. 14, 1950 3 Sheets-Sheet 2

INVENTOR.
BERNARD D. LOUGHLIN
BY Laurence B. Dodds
ATTORNEY

INVENTOR.
BERNARD D. LOUGHLIN
BY Laurence B. Dodds
ATTORNEY

Patented May 11, 1954 2,678,389

UNITED STATES PATENT OFFICE 2,678,389

SIGNAL-TRANSLATING SYSTEM FOR TELEVISION RECEIVERS

Bernard D. Loughlin, Lynbrook, N. Y., assignor to Hazeltine Research, Inc., Chicago, Ill., a corporation of Illinois Application August 14, 1950, Serial No. 179,123

17 Claims. (Cl. 250—27)

*General*

Figure 1:
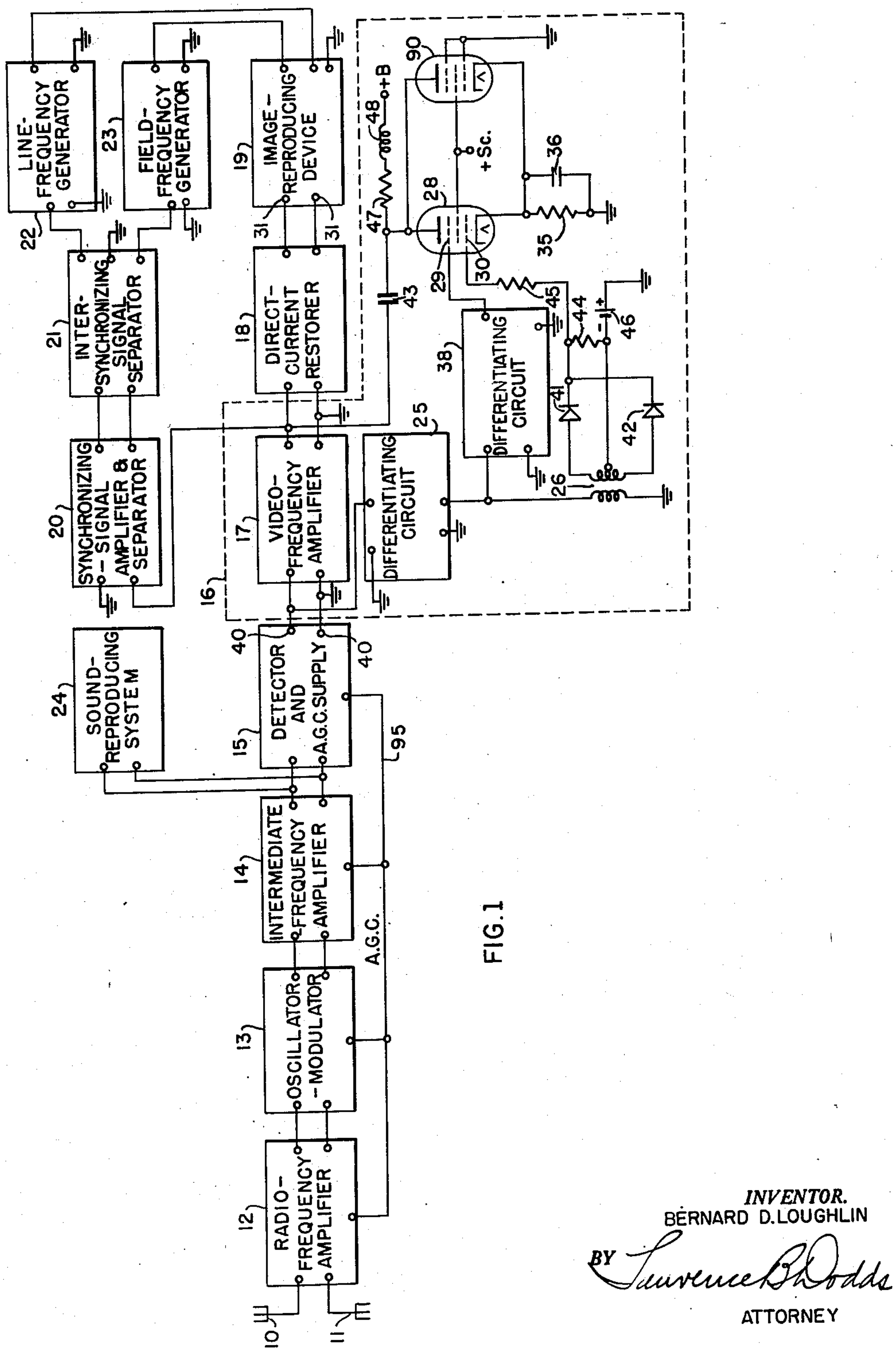

The present invention relates to transient modifying electrical signal-translating systems for television receivers and, particularly, to such systems which are effective, while translating an applied television signal including unidirectional transients, to develop a television output signal including modified transients which may correspond approximately to, but have slopes much steeper than, the transients appearing in the applied signal. The term "unidirectional transient," as employed in the specification and claims, is intended to denote a sudden change in the amplitude of a signal such as may occur in the video-frequency portion of a detected television signal between two amplitude levels thereof corresponding to an abrupt change in brightness level in the televised image, for example from black to white. Transient modifying electrical signal-translating systems of the type under consideration have particular utility in television receivers for improving the sharpness of the images produced thereby and, hence, will be described in that environment.

There presently exists the belief that much of the eye fatigue and other unpleasant reactions often experienced by individuals viewing the image or picture produced by a television receiver is due to insufficient sharpness of the picture rather than to inadequate detail or resolution. By sharpness of the reproduced picture is meant the rate of change of brightness thereof with space, that is, sharpness is related to the appearance of a distinct edge between two areas of different brightness. The lack of sharpness of the picture being viewed is believed to cause the eye muscles of an observer to attempt to produce a sharper or better focused image on the retina of the eye. When the picture being viewed has insufficient sharpness, there may result a continued subconscious action on the part of the observer to focus his eyes in the manner just mentioned, thus causing eye fatigue. On the other hand, inadequate detail in the viewed picture is believed merely to influence the recognition of fine detailed objects. It has been recognized that the above-mentioned distress experienced by those observing television entertainment may be further aggravated as the use of television image-reproducing devices with larger display areas become more widespread. This is because one observing a larger television picture is more likely to sit at such a distance that the picture will subtend a larger viewing angle at the eye, thus making the "grain" or "spot" structure of the picture more visible. Since the present trend in television receivers is towards the use of larger image-reproducing devices, the problem of imparting greater sharpness to the television pictures is assuming greater importance.

Considering now a complete television system including both the transmitter and the receiver, there are one or more factors which are instrumental in causing the bandwidth of a television signal translated by the system to be limited. Band-width limitation occurs in the scanning spot of the camera or picture tube at the transmitter, in the signal-translating channels of both the transmitter and the receiver, and in the scanning spot of the image-reproducing device of the receiver. The limitation on bandwidth imposes a corresponding limitation on the detail or resolution of the picture produced by the receiver of the television system. In conventional television receivers, the relatively limited bandwidth of the signal-translating channel thereof also undesirably placed a limitation on the sharpness of the reproduced picture. Heretofore it has been the opinion of workers in the television art that the resulting limitation placed on the sharpness of the reproduced picture was a fundamental one, that is, that the limited bandwidth imposed by the electrical circuits and the scanning spots inherently prevented the translation of the highest frequency components of an applied television signal, thus prolonging the time required for a transient to pass from one amplitude level to another, and that this necessarily resulted in a degraded transient having a gradual slope rather than a steep one, thus causing a general lack of sharpness in the reproduced picture. It recently has been conclusively demonstrated, however, that the sharpness of the reproduced television picture need not be limited by the bandwidth of the television signal-translating circuits and the scanning spots mentioned above. It has been established that the limited bandwidth of the signal-translating stages of television apparatus, such as a television receiver, is effective to limit only the permissible minimum time separation between two successive unidirectional transients but need not limit the permissible steepness of a transient.

Although it is ordinarily desirable to employ transient modifying electrical signal-translating systems in accordance with the present invention in connection with television receivers having pass-band characteristics such as are ordinarily employed in receivers available today, it may also be desirable in many applications, such as in low-cost receivers having relatively inexpensive circuits characterized by their narrower pass-band characteristics, to utilize transient modifying signal-translating systems which enable such receivers to produce pictures having a sharpness comparable to that of pictures produced by conventional television receivers.

It is an object of the invention, therefore, to provide a new and improved signal-translating system for a television receiver which avoids one or more of the above-mentioned disadvantages and limitations resulting from the use of prior translating systems in television receivers.

It is another object of the invention to provide a relatively simple signal-translating system for use in a television receiver to enable the receiver to produce a picture which is considerably sharper than has heretofore been obtainable.

It is a further object of the invention to provide a new and improved signal-translating system for use in a television reveiver to reduce the eye fatigue and other unpleasant reactions ordinarily experienced by some observers of the television pictures produced by the receiver.

It is yet another object of the invention to provide a new and improved transient modifying signal-translating system for use in a television receiver provided with an image-reproducing system having a relatively large display area to produce a sharp picture thereon.

It is an additional object of the invention to provide a transient modifying electrical signal-translating system for a television receiver having a narrow pass-band characteristic to enable that receiver to develop a television image having a sharpness comparable to that of the image produced by a conventional receiver having a much wider bandpass characteristic.

In accordance with a particular form of the invention, a transient modifying electrical signal-translating system for a television receiver for translating a television picture signal which may include unidirectional transients comprises a television signal-translating channel normally having a substantially linear signal-translating characteristic for faithfully translating the aforesaid signal. The signal-translating system also includes control circuit means coupled to the channel and effective to develop a signal representative of a derivative of the transients of the picture signal. The signal-translating system further includes translating means having a controllable signal-translating characteristic coupled to the channel and the control circuit means. The system additionally includes a circuit coupled to the aforesaid control circuit means and the translating means and responsive to the above-mentioned control signal for causing the translating means effectively to introduce a modifying signal into the channel to modify the signal translated thereby within a short interval after the initiation of the transients, whereby the output signal of the channel approximately corresponds to the picture signal with modified transients.

The term "derivative," as employed throughout the specification and claims, is intended to denote any signal having the general wave form of a derivative. Broadly speaking a derivative of an applied signal is a signal related to a changing characteristic of that applied signal, that is, a signal which has a zero value when that applied signal is constant in magnitude at any particular amplitude level and has some magnitude other than zero when the applied signal has a transient between two amplitude levels. Thus, the broad term "derivative," as used in the specification and claims, is not necessarily a simple, first, second or third derivative but may include non-nonlinear functions of simple derivatives, cross products between simple derivatives, time difference signals, or any other functions producing signals of the general form described above.

For a better understanding of the present invention, together with other and further objects thereof, reference is had to the following description taken in connection with the accompanying drawings, and its scope will be pointed out in the appended claims.

Figure 4:
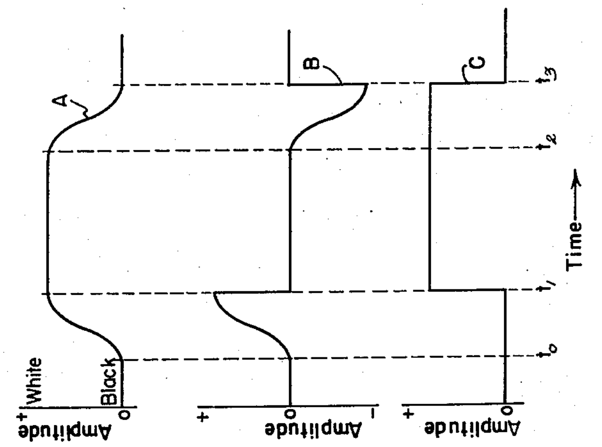
Figure 3:
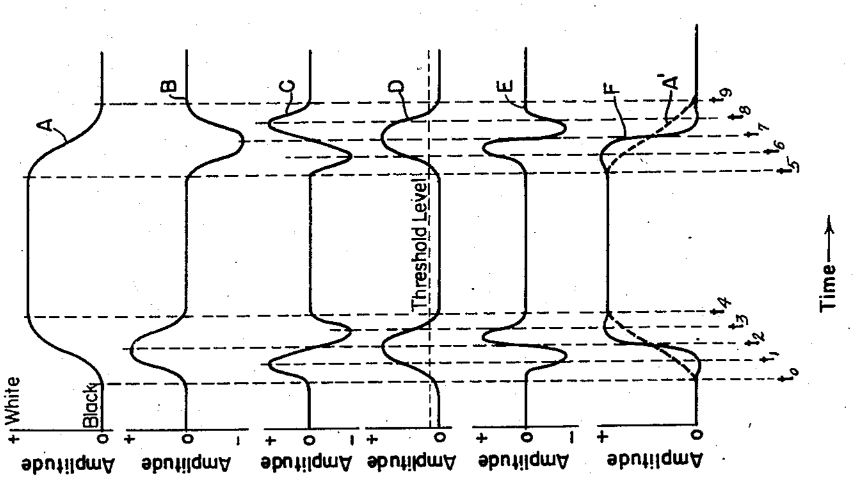
Figure 2:
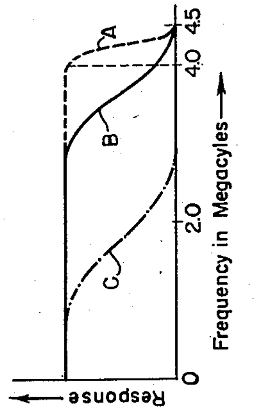
Figure 7:
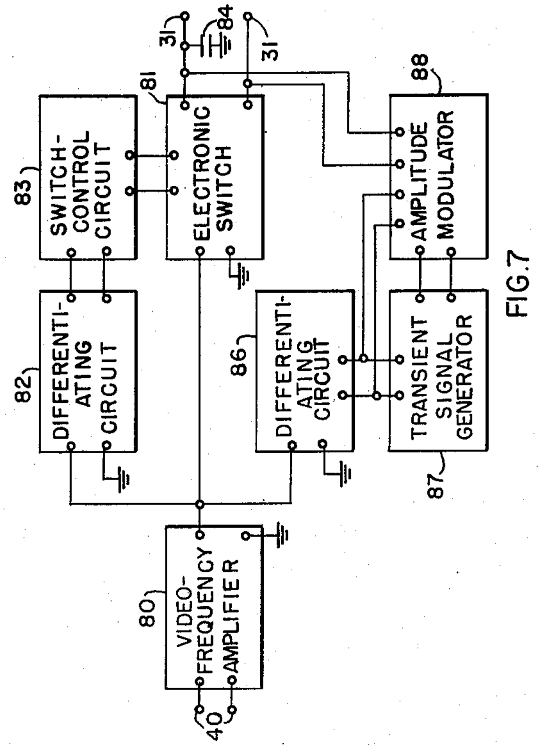
Figure 6:
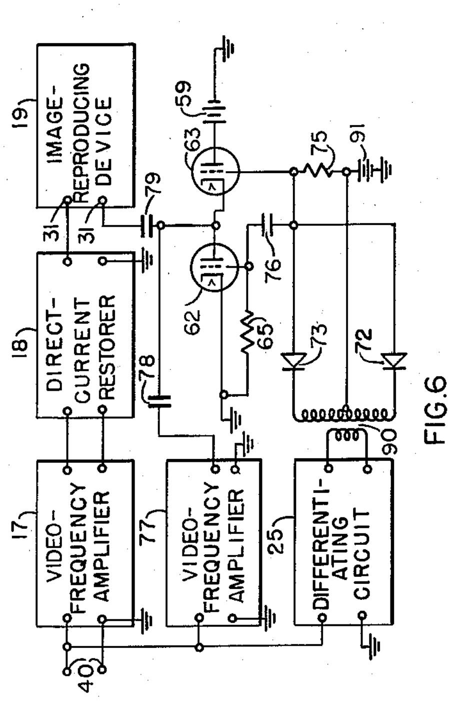
Figure 5:
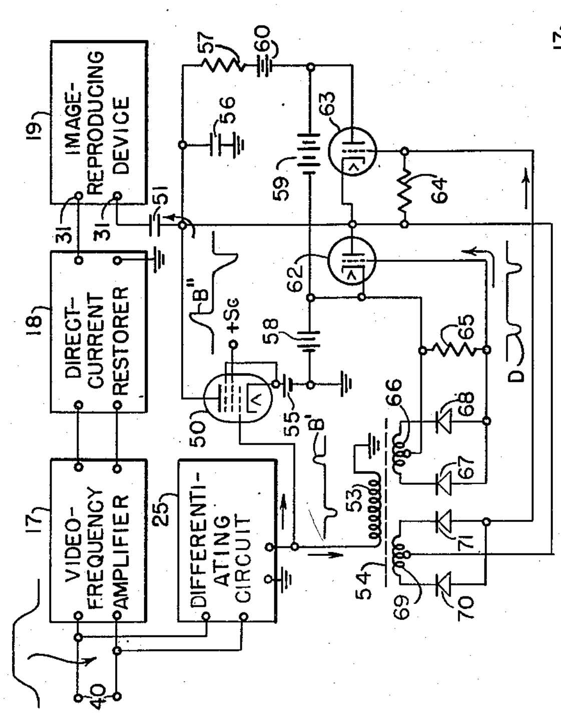

In the accompanying drawings, Fig. 1 is a circuit diagram, partly schematic, of a complete television receiver including a transient modifying electrical signal-translating system in accordance with a particular form of the present invention; Figs. 2 and 3 are graphs utilized in explaining the operation of the transient modifying electrical signal-translating system of the Fig. 1 receiver; Fig. 4 is a graph utilized in explaining the operation of a modified form of signal-translating system embodying the invention; Fig. 5 is a schematic circuit diagram of a signal-translating system operating in accordance with the graph of Fig. 4; Fig. 6 is a modified form of the signal-translating system of Fig. 5; and Fig. 7 is still another modification of a transient modifying signal-translating system in accordance with the present invention.

*General description of Fig. 1 receiver*

Referring now more particularly to Fig. 1 of the drawings, the television receiver there represented comprises a receiver of the superheterodyne type including an antenna system 10, 11 coupled to a radio-frequency amplifier 12 of one or more stages. There is coupled to the latter unit in cascade, in the order named, an oscillabor-modulator 13, an intermediate-frequency amplifier 14 of one or more stages, a detector and automatic-gain-control or A. G. C. supply unit 15 having a pair of output terminals 40, 40, a transient modifying electrical signal-translating system 16 including a conventional video-frequency amplifier 17 of one or more stages, a direct-current restorer 18, and a cathode-ray image-reproducing device 19 of conventional construction provided with input terminals 31, 31, adapted to be individually connected to the brilliancy-control electrode and cathode of a cathode-ray tube thereof, and the usual line-frequency and field-frequency scanning coils (not shown) for deflecting the cathode-ray beam in two directions normal to each other. The A. G. C. supply circuit 15 is connected to the input circuits of one or more of the stages of units 12, 13 and 14 by a control circuit conductor 95. Connected to the output terminals of the intermediate-frequency amplifier 14 is a conventional sound-reproducing system 24 which comprises the usual amplifiers, a frequency changer, a frequency detector, and a loud-speaker.

An output circuit of the video-frequency amplifier 17 is coupled to the input circuit of a line-frequency generator 22 and a field-frequency generator 23 through a synchronizing-signal amplifier and separator 20 and an intersynchronizing-signal separator 21. The output circuits of the generators 22 and 23 are coupled in a conventional manner to the scanning coils of the image-reproducing device 19. The units 10–24, inclusive, with the exception of the transient modifying electrical signal-translating system 16 which is constructed in accordance with the present invention and will be described in detail hereinafter, may be of conventional construction and operation so that a detailed description and explanation of the operation thereof are unnecessary herein.

*General operation of Fig. 1 receiver*

Considering briefly, however, the general operation of the above-described receiver as a whole, television signals intercepted by the antenna system 10, 11 are selected and amplified in the radio-frequency amplifier 12 and are supplied to the oscillator-modulator 13, wherein they are converted to intermediate-frequency signals. The latter, in turn, are selectively amplified in the intermediate-frequency amplifier 14 and are delivered to the detector and automatic-gain-control supply unit 15. The modulation components of the signal are derived by the detector 15 and are supplied to the video-frequency amplifier 17 wherein they are amplified and from which they are supplied to the direct-current restorer 18 and then to the input circuit of the image-reproducing device 19. The transient modifying operation of unit 16 will be explained in detail hereinafter. A control voltage derived by the automatic-gain-control supply of unit 15 is applied as an automatic-amplification-control bias to the gain-control circuits of units 12, 13 and 14 to maintain the signal input to the detector of unit 15 within a relatively narrow range for a wide range of received signal intensities.

Unit 20 selects the synchronizing signals from the other modulation components of the composite television signal applied thereto from the video-frequency amplifier 17. The line-synchronizing and the field-synchronizing signals derived by the separator 20 are separated from each other by the unit 21 and are then individually supplied to the generators 22 and 23 to synchronize the operation thereof. An electron beam is produced by the cathode-ray image-reproducing device 19 and the intensity of this beam is controlled in accordance with the video-frequency and control voltages impressed thereon by the terminals 31, 31. Saw-tooth waves are generated in the line-frequency and the field-frequency generators 22 and 23, respectively, and are applied to the scanning coils of unit 19 to produce scanning fields, thereby to deflect the cathode-ray beam of that unit in two directions normal to each other to trace a rectilinear scanning pattern on the screen of the tube and thereby reconstruct the translated picture.

The audio-frequency modulation components of the received signal are derived in a well-known manner in the sound-reproducing system 24 and are applied to the loud-speaker thereof wherein they are converted to sound.

*Description of transient modifying signal-translating system of Fig. 1*

Referring now more particularly to the portion of the receiver embodying the present invention, the transient modifying electrical signal-translating system 16 for translating the applied television signal which may include unidirectional transients, comprises a television signal-translating channel which includes the video-frequency amplifier 17. The signal-translating channel may be considered to include the amplifier 17 and the preceding units 12—15, inclusive. In the last-mentioned case, the over-all frequency-response characteristic of the complete receiver television signal-translating channel from its input circuit to its output circuit may also correspond to that of a conventional receiver television channel having, for example, a frequency-response characteristic of the type represented by curve A of Fig. 2 with a sharp cutoff characteristic at the high-frequency end of the pass band, for example at 4 megacycles. Accordingly, such a channel has a substantially linear signal-translating characteristic for faithfully translating an applied picture signal. Alternatively the channel may have a frequency-response characteristic somewhat less than that of such a conventional television signal-translating channel. Specifically, the channel may have a slightly more gradual cutoff characteristic at the high-frequency end of the pass band as represented by curve B of Fig. 2, so that the translation of the unidirectional transients by the channel tends to be somewhat degraded due to its inability to translate the highest frequency components. On the other hand, the over-all frequency-response characteristic of the receiver may be relatively poor, having a gradual cutoff of the type represented by the curve C. A receiver having such a characteristic will be characterized by the inability of the main signal-translating channel to translate the higher frequency components of an applied television signal.

The signal-translating system also includes control circuit means coupled to the aforesaid channel including the amplifier 17 for developing a control signal therefrom. This control circuit comprises a differentiating circuit 25, which may be of any conventional type, coupled to the input circuit of the amplifier 17 and effective to develop a control signal representative of the first derivative of transients applied thereto by the terminals 40, 40. For some applications it may be preferable that unit 25 also include suitable amplifier stages. The output terminals of the differentiating circuit 25 are coupled to the primary winding of a transformer 26.

The signal-translating system in accordance with the invention further includes translating means having a controllable signal-translating characteristic, specifically a nonlinear signal-translating characteristic, coupled to the described channel and the differentiating circuit 25, and a circuit coupled to the aforesaid control circuit means and the translating means and responsive to the control signal or first derivative developed by the latter for causing the aforesaid translating means effectively to introduce a modifying signal into the channel to modify the signal translated by the channel within a short interval after the initiation of the transients, whereby the output signal of the channel approximately corresponds to the applied picture signal with modified transients. This translating or modifying means comprises a repeater system including an electron-discharge device in the form of a pentode 28 and a pentode 90, the former having a pair of input electrodes 29 and 30. The anode of tube 28 is directly connected to the anode of the tube 90 and is also connected to an energizing source indicated as +B through a load resistor 47 and a peaking inductor 48. The anodes of the tubes 28 and 90 are also coupled to the high-potential input terminal of the restorer 18 through a coupling condenser 43. The screen electrodes of the tubes 28 and 90 are interconnected and are coupled in a conventional manner to a unidirectional source indicated as +Sc. The control and suppressor electrodes of the tube 90 are connected to ground. The cathode of tube 28 and the cathode of tube 90 are connected together and are coupled to ground through a parallel-connected resistor-condenser network 35, 36. This network, which is responsive to the signal applied to the control electrode 30 of the tube 28, has parameters so proportioned that the repeater, including the tube 28, is degenerative with reference to the signal applied to the control electrode 30 and is thus effective to prevent oscillatory components following a transient from being introduced into the signal-translating channel through the condenser 43 in a manner to be explained subsequently.

The translating means further includes a conventional differentiating circuit 38 which is coupled between the output terminals of the circuit 25 and the input electrodes of the tube 28 including electrode 29 for deriving and applying thereto the second derivative of the transient applied to the terminals 40, 40. The circuit responsive to the control signal from unit 25 also includes rectifier means for deriving a signal or control potential corresponding to the absolute magnitude of the aforementioned first derivative and for applying that control potential to the input electrodes of the tube 28 including electrode 30. This rectifier means comprises a bi-phase or full-wave rectifier system, that is, one capable of producing an output signal for each half cycle of an applied signal, including rectifier devices 41 and 42 having corresponding electrodes coupled to opposite ends of the center-tapped secondary winding of the transformer 26. The other electrodes of the devices are connected together and to one terminal of a load resistor 44, the other terminal of which is connected to the center tap of the transformer secondary winding. The load resistor 44 is coupled to the input electrodes of the tube 28 including electrode 30 through a resistor 45 and a bias battery 46. The bias for tube 28 is preferably so selected that it is normally operating near anode-current cutoff and effectively responds only to transients which exceed a predetermined amplitude. The operating potentials applied to the tube 90 are such that it is normally conductive.

*Operation of transient modifying signal-translating system of Fig. 1*

It will be assumed initially that the receiver including the system 16 has a frequency-response characteristic as represented by curve A of Fig. 2. The operation of the transient modifying signal-translating system 16 represented in Fig. 1 and the results obtained thereby may be best understood with reference to the curves of Fig. 3 of the drawings. Curve A of Fig. 3 represents to a very enlarged scale a fragmentary portion of an amplified video-frequency signal supplied in a single line scansion by the output terminals 40, 40 of the detector unit 15 to the transient modifying signal-translating system 16. At time $t_0$ a positive-going transient of the television signal is initated and terminates at time $t_4$. Following the transient the unidirectional signal continues at a substantially uniform amplitude level until time $t_5$ whereupon a second and negative-going transient occurs and terminates at approximately time $t_9$. For the purpose of the explanation which follows, it will be assumed that the frequency-response characteristic of the signal-translating system of Fig. 1 including the amplifier 17, when unmodified by the action of units 25, 28, 38, 41, 42 and associated circuit elements, is such that the system is incapable of faithfully translating transients steeper than those represented in curve A of Fig. 3.

The differentiating circuit 25 responds to the transients described in the preceding paragraph and, by the well-known differentiating operation, develops an output signal corresponding to curve B of Fig. 3. The output signal of circuit 25 represents the first derivative signal of that of curve A and is applied to the differentiating circuit 38 which develops, in the well-known manner an output signal having the wave form represented by curve C of Fig. 3. It will be seen that the last-mentioned signal represents the second derivative of the transients of curve A. It will be clear from curves B and C that the first derivative of the transients has a maximum amplitude at times $t_2$ and $t_7$ (considering both the positive and the negative portions) while the second derivative has maximum amplitude values at times $t_1$, $t_3$, $t_6$ and $t_8$.

The output signal of the differentiating circuit 25 is also applied to the full-wave rectifier system 41, 42 which envelops in a conventional manner an output signal having a wave form represented by curve D of Fig. 3. It will be seen that the signal of curve D comprises a unidirectional signal of positive polarity corresponding to the absolute magnitude of the derivative of the curve A. When the control potential from the rectifier devices 41, 42 exceeds a predetermined amplitude or threshold level established by the battery 46 (see curve D of Fig. 3), the transconductance of tube 28 is so modified that it is rendered conductive. The current flowing in the cathode circuit of the tube 28 is effective to bias the normally conductive tube 90 toward anode-current cutoff, thus developing at the anode of tube 90 a signal having the wave form and polarity represented above the threshold level in curve D of Fig. 3. Thus the developed signal effectively cancels a similar signal of opposite polarity developed at the anode of tube 28 by the signal applied to its control electrode 30. Consequently, the resultant output signal at the anode of tube 28 appears as represented by curve E of Fig. 3. Thus the signal of curve D applied to the input electrode 30 of tube 28 in effect modulates the signal of curve C which is applied to the input electrode 29 and the signal of curve E is the product of the second derivative of the transients represented by curve C and the absolute magnitude of the first derivative represented by curve D. It will be seen from curve E that this signal has extremely steep slopes at approximately times $t_2$ and $t_7$, which slopes, for the same peak-to-peak value of signal, are appreciably steeper than the slopes of related curve C at the corresponding times. Furthermore, the time spacing between adjacent opposite polarity peaks of the signal of curve E is considerably less than the time spacing for the corresponding peaks represented in curve C.

The product signal of curve E as applied through the coupling condenser 43 to the signal-translating channel combines with the signal of curve A translated by the video-frequency amplifier 17 to form in the input circuit of the unit 18 a resultant signal having a wave form represented by curve F of Fig. 3. Thus the resultant signal corresponds approximately to the signal applied to the transient modifying system by the terminals 40, 40 (the last-mentioned signal being represented in part by the broken-line curve A' of Fig. 3 for comparison purposes adjacent the resultant signal of curve F) but with modified transients which are much steeper than the transients of the aforesaid applied signal, particularly near the center portions $t_2$ and $t_7$ of the applied transients, and with little or no undershoot or overshoot at the beginning and end of each transient, respectively. It will be seen from curve F of Fig. 3 that the resultant signal has steeper transients and less overshoot than would result if only the second derivative signal represented by curve C were introduced into the signal-translating channel in correct polarity through a linear system.

As previously mentioned, the signals applied to the input electrodes 29 and 30 of the tube 28 by the differentiating circuit 38 and the rectifier system including devices 41 and 42 are effective to modify the transconductance of the tube during a transient. Consequently, the space-current flow in the tube develops a bias across the resistor-condenser network 35, 36 in the cathode circuit of the tube. This bias potential reduces the gain of the tube for a short interval after the occurrence of the transient, thus preventing oscillatory components following a transient from being introduced by the tube 28 into the signal-translating channel of the receiver. Shortly thereafter the charge developed across the condenser 36 is dissipated by the resistor 35.

When the signal-translating channel of the receiver has a frequency-response characteristic of the type represented by curve B of Fig. 2 with a somewhat gradual cutoff characteristic at the high-frequency portion of the pass band, the channel is not quite able faithfully to translate the highest frequency components of the transients so that the over-all translation by the channel is somewhat degraded. However, the sharpness improvement circuits of the present invention associated with the signal-translating channel cause a video-frequency signal effectively including steep transients to be applied to the image-reproducing device 19, thus causing the reproduced picture to have a sharpness comparable to that provided by a conventional high-quality receiver. The gradual cutoff characteristic of the signal-translating channel may prove advantageous for some applications, since it is effective to suppress oscillatory components following a transient in the signal-translating channel.

When the signal-translating channel of the receiver has a narow pass-band and a frequency-response characteristic with a gradual cutoff, as represented by curve C of Fig. 2, oscillatory components following a transient are suppressed in that channel. However, in the absence of a transient modifying system in accordance with the invention in a television signal-translating channel having the characteristic represented by curve C of Fig. 2, that channel would ordinarily be ineffective to produce a picture of satisfactory quality on the screen of an image-reproducing device. The application by unit 16 to the image-reproducing device 19 of the video-frequency signal with its modified or improved transients, however, causes the image-reproducing device to develop an image having adequate sharpness for viewing purposes.

Thus, it will be seen from the foregoing explanation that the translating means positioned between the output circuit of unit 25 and the input circuit of the direct-current restorer 18 has a controllable or nonlinear signal-translating characteristic and is responsive to the control signal or first derivative developed by the unit 25 for effectively introducing a signal into the signal-translating channel to modify the signal translated thereby within a short interval after the initiation of transients, whereby the output signal of the channel approximately corresponds to the applied signal with modified transients which are much steeper than the transients of the applied signal. The operation of the transient-modifying signal-translating system is such that the modified transients developed thereby so control or modify the intensity of the electron beam of the image-reproducing device 19 that the image reproduced on the fluorescent screen thereof has exceptional sharpness in the horizontal direction.

*Explanation of curves of Fig. 4*

A modified form of the transient modifying signal-translating system in accordance with the present invention will be explained with reference to the curves of Fig. 4. Curve A thereof, which corresponds to curve A of Fig. 3, represents a small portion of a television signal developed in a single line scansion and appearing at the output terminals of the second detector unit of a television receiver. It will be assumed for the purpose of this discussion that the signal of curve A is applied through a suitable signal-translating system to the brilliancy-control electrode of the cathode-ray image-reproducing device of the television receiver. The transients of this signal occur during the intervals $t_0$—$t_1$ and $t_2$—$t_3$. If, however, a signal having the wave form of curve B during the interval $t_0$—$t_3$ is also introduced by suitable apparatus to the signal-translating channel coupled to the cathode of the image-reproducing device (or a signal having a similar shape but opposite polarity to that represented by curve B during the intervals $t_0$—$t_1$ and $t_2$—$t_3$ is also supplied to the brilliancy-control electrode), the transients of the signal of curve A are effectively subtracted from that signal, thereby producing a resultant signal having the wave form of curve C of Fig. 4. It will be seen from curve C that at time $t_1$ the resultant signal applied to the input circuit of the cathode-ray image-reproducing device has an exceedingly steep, positive-going transient and a correspondingly steep, negatively going transient at time $t_3$. The signal-reproducing device of the television receiver is effective to produce in response to a signal of the type represented by curve C a television picture of unusual sharpness.

*Description of modified system of Fig. 5*

Referring now to Fig. 5 of the drawings, there is represented schematically another embodiment of the invention which is adapted to be coupled to the output terminals 40, 40 of the detector 15 and to the input terminals 31, 31 of the image-reproducing device 19 of the receiver represented in Fig. 1. The transient modifying signal-translating system represented in Fig. 5 includes a television signal-translating channel including the video-frequency amplifier 17 and a direct-current restorer 18 for connection as stated. On the other hand, the signal-translating channel may be considered to include the usual television signal-translating stages preceding the video-frequency amplifier 17. In that case, the over-all frequency-response characteristic of the receiver may correspond to any of those represented by curves A, B and C of Fig. 2. The system also includes control circuit means in the form of a differentiating circuit 25 which is coupled to the signal-translating channel including units 17 and 18 and is effective to develop a control signal representative of a derivative of the transients in the applied television signal, in particular the first derivative of those transients. The transient modifying system further includes a repeater which is responsive to the aforesaid first derivative signal coupled between the differentiating circuit 25 and the channel. This repeater includes a pentode 50 having input electrodes which are coupled to the output terminals of the differentiating circuit 25, and an output circuit having an anode which is coupled through a coupling condenser 51 to the terminal 31 that is connected to the cathode of the cathode-ray image-reproducing device 19. The input electrodes of tube 50 are connected across the primary winding 53 of a transformer 54, the cathode being biased by a battery 55. The output circuit of the tube 50 includes an integrating circuit comprising a condenser 56 in parallel with a resistor 57, and a space-current source represented by batteries 58, 59 and 60. The parameters of the network including the resistor 57 and the condenser 56 are so selected that the network is effective to integrate in the output circuit of the tube 50, over a period of time at least equal to the transient duration, the portions of a signal applied to the input circuit thereof.

Control means in the form of a clamping circuit is coupled to the repeater including the tube 50 for normally preventing the application of a signal by the repeater 50 to the signal-translating channel between the terminals 40, 40 and the image-reproducing device 19. This means includes a pair of tubes 62 and 63 which are coupled in series across the terminals of the battery 59. The junction of the cathode of the tube 63 and the anode of the tube 62 is connected directly to the anode of the tube 50 and is also connected to the control electrode of the tube 63 through a load resistor 64 for the rectifier devices 70 and 71. Rectifier devices 67 and 68 are provided with a load resistor 65. The operating potentials applied to the tubes 62 and 63 are such that these tubes are normally conductive and are also such that the anode of the tube 50 is normally maintained by the first-mentioned tubes at the same potential as would exist at that anode when no signal is applied to the control electrode of tube 50 and the tubes 62 and 63 are nonconductive.

The transient modifying signal-translating system additionally includes rectifier means coupled between the differentiating circuit 25 and the clamping circuit including the tubes 62 and 63, this rectifier means being responsive to the first derivative signal from unit 25 for so controlling the clamping circuit within short intervals after the initiation of a transient applied to the terminals 40, 40 that the repeater including the tube 50 is caused during the aforesaid short intervals to introduce into the signal-translating channel at the terminal 31 of the image-reproducing device 19 a signal having such characteristics as substantially to cancel the transient, whereby the output signal of the channel approximately corresponds to the applied signal but with transients much steeper than those transients of the television signal applied to the terminals 40, 40. This rectifier means includes a center-tapped secondary winding 66 of the transformer 54 and a pair of rectifier devices 67 and 68 connected in a conventional full-wave manner and having a load resistor 65 which is connected to the input electrodes of tube 62. This rectifier means further includes a second center-tapped secondary winding 69 and a pair of rectifier devices 70 and 71 connected in a conventional full-wave rectifier manner and having a load resistor 64 which is connected to the input electrodes of tube 63.

*Operation of the Fig. 5 system*

Consider now the operation of the transient modifying signal-translating system of Fig. 5 during the application of a television signal to the terminals 40, 40 thereof, a fragmentary portion of which signal has the wave form represented by curve A of Fig. 4 and thus includes unidirectional transients. The transients of that portion of the television signal applied to the differentiating circuit 25 are differentiated to produce a negative first derivative signal having the wave form represented by curve B′ in Fig. 5 near the output circuit of unit 25. The negative first derivative signal therefore comprises a negative-going pulse followed by a positive-going pulse and is applied to both the control electrode of the tube 50 and to the transformer 54 associated with the rectifier systems including the rectifier devices 67, 68, 70 and 71. In a well-known manner each pair of rectifier devices develops a pair of negative-going pulses, as represented by curve D adjacent those devices, for application to the control electrodes of the tubes 62 and 63 of the clamping circuit. During the intervals before and after each of these pulses, the anode of the tube 50 is maintained at a fixed potential corresponding to the potential at the junction of the cathode of the tube 63 and the anode of the tube 62. The negative polarity pulses of curve D are effective to render the tubes 62 and 63 nonconductive. During these pulse intervals, the negative- and positive-going pulses represented by curve B′ are simultaneously supplied to the control electrode of tube 50. The network 56, 57 effectively integrates the amplified input pulses of curve B′ over the intervals of each of the transients, thereby producing an output signal, represented by curve B″ adjacent tube 50, for application through the condenser 51 to the cathode of the image-reproducing device 19. This last-mentioned signal has a wave form with steep trailing edges corresponding substantially to that represented by curve B of Fig. 4 of the drawings. The circuit constants are so chosen that the signal represented by curve B″ of Fig. 5 is of such magnitude and polarity as substantially to cancel the transients appearing in the output circuit of the direct-current restorer 18. Thus the resultant output signal of the transient modifying signal-transmitting system as applied to the image-reproducing device 19 effectively has a wave form corresponding substantially with that represented by curve C of Fig. 4. Accordingly, the image-reproducing device 19 is able to reproduce a television picture of unusual sharpness.

*Description of Fig. 6 embodiment*

Referring now to Fig. 6 of the drawings, there is represented, partially schematically, an additional embodiment of the invention which is similar to that represented in Fig. 5 and is adapted to be connected to the television receiver of Fig. 1 in the manner described in connection with the Fig. 5 system. The over-all frequency-response characteristic of the video-frequency amplifier and preceding receiver stages may correspond to any of those represented by curves A, B, and C of Fig. 2. In view of the similarity of these two systems, corresponding elements thereof are designated by the same reference numerals. The system of Fig. 6 includes a pair of normally conductive tubes 62 and 63 which form a clamping circuit for a purpose to be explained hereinafter. A rectifier system is coupled between the output circuit of the differentiating circuit 25 and the input circuits of the tubes 62 and 63. This rectifier system includes a transformer 90, the primary winding of which is connected to the output terminals of the differentiating circuit and the center-tapped secondary of which is connected with rectifier devices 72 and 73 in a conventional manner to form a full-wave or bi-phase rectifier having a load resistor 75. A battery 91 supplies a suitable bias to the control electrode of the tube 63 through resistor 75. The control electrodes of the tubes 62 and 63 are interconnected through a coupling condenser 76.

A second video-frequency amplifier 77 is coupled between the terminals 40, 40 and the input electrode 31 connected to the cathode of the image-reproducing device 19 through a pair of series-connected condensers 78 and 79. The amplifier 77 preferably is of the low-impedance output type and hence may comprise a conventional cathode-follower amplifier. The junction of the condensers 78 and 79 is connected to the junction of the anode of tube 62 and the cathode of tube 63.

*Operation of circuit of Fig. 6*

The operation of the circuit of Fig. 6 may best be understood with reference to the curves of Fig. 4 wherein curve A represents a fragmentary portion of a television signal applied to the input terminals 40, 40 of the signal-translating system. Since the tubes 62 and 63 are conductive in the absence of the application of transients to the differentiating circuit 25, the junction of condensers 78 and 79 is maintained, in the absence of transients, at a relatively fixed potential corresponding to that of the cathode of the tube 63 and the anode of the tube 62. Thus, the video-frequency amplifier 77 is unable, in the absence of a transient of the type under consideration, to apply an output signal to the terminal 31 of the image-reproducing device. During the occurrence of a transient, however, such as during the intervals $t_0$—$t_1$ and $t_2$—$t_3$ represented in Fig. 4, the first derivative of the transient is applied through the transformer 90 to the rectifier system including the tubes 72 and 73 which are, in turn, effective to develop negative polarity-control potentials during intervals $t_0$—$t_1$ and $t_2$—$t_3$ for application to the control electrodes of the tubes 62 and 63. These control potentials render the clamping means including the tubes 62 and 63 nonconductive during approximately the entire interval of the transients, thereby removing during those intervals the previously mentioned fixed potential from the junction of the condensers 78 and 79. Accordingly, the video-frequency amplifier 77 is then effective to translate through the coupling condensers 78 and 79 to the terminal 31 a control potential having a wave form corresponding substantially to that represented by curve B of Fig. 4. The circuit constants are so selected that the signal supplied to the image-reproducing device 19 by the amplifier 77 during the intervals of the transients is of such magnitude and polarity as substantially to cancel the transients. Hence, the signal effectively applied to the image-reproducing device 19 by the transient modifying signal-translating channel has a wave form corresponding to that shown in curve C of Fig. 4, which signal corresponds approximately with the signal applied to the terminals 40, 40 but with transients much steeper than the original transients.

*Description of the Fig. 7 embodiment*

Fig. 7 of the drawings represents diagrammatically a further embodiment of a transient modifying signal-translating system in accordance with the present invention. This system includes a video-frequency amplifier 80 and an electronic switch 81 which are connected in cascade and are adapted to be coupled between the terminals 40, 40 and 31, 31 of the receiver represented in Fig. 1. The over-all frequency-response characteristic of the video-frequency amplifier 80 and preceding receiver stages may correspond to any of those represented by curves A, B, and C of Fig. 2. The television signal-tranlating channel including the units 80 and 81 normally has a substantially linear signal-translating characteristic for an applied signal. The system further includes a first control circuit coupled to the channel for developing a first control effect related to a derivative of the transients in the television signal applied to the terminals 40, 40. This control circuit includes a differentiating circuit 82 of conventional construction coupled to the output circuit of the amplifier 80. The system further includes means responsive to the control signal developed by unit 82 for modifying the signal-translating characteristic of the channel including units 80 and 81 within a short interval after the initiation of the above-mentioned transients. This modifying means comprises a switch-control circuit 83 which is connected between the output circuit of unit 82 and an input circuit of the electronic switch 81. A condenser 84 may be connected between the high-potential one of the output terminals of the switch 81 and ground. The signal-translating system thus far described corresponds with that described in Fig. 1 of applicant's copending application Serial No. 179,121, filed August 14, 1950, entitled "Signal-Translating System for a Television Receiver." For a more complete description and explanation of its operation, reference is made to the above-identified copending application.

The transient modifying signal-translating system in accordance with the present invention further includes a second control circuit coupled to main signal-translating channel and effective to develop a second control signal representative of a derivative of the transients. This circuit includes a differentiating circuit 86 which is coupled to the output circuit of the video-frequency amplifier 80. The system additionally includes means having a controllable signal-translating characteristic coupled to the channel and the differentiating circuit 86, means compressing a circuit responsive to the derivative signal developed by the last-mentioned unit for effectively introducing a signal into the channel to modify the signal translated thereby within a short interval after the initiation of the transients, whereby the output signal of the channel approximately corresponds to the signal applied to the channel but with modified transients. These means include a transient signal generator 87 and an amplitude modulator 88, the output terminals of the latter being coupled to output terminals 31, 31. The transient signal generator is proportioned to generate a transient signal of a desired shape which is ordinarily steeper than the transient signal applied to the terminals 40, 40. An input circuit of the amplitude modulator 88 is connected to the output circuit of the generator 87 and a second input circuit of the modulator is coupled to the output terminals of the differentiating circuit 86.

*Operation of the system of Fig. 7*

Considering now the operation of the Fig. 7 circuit, it will be assumed initially that a television signal which does not include steep unidirectional transients is applied to the video-frequency amplifier 80. For such a signal, electronic switch 81 is effectively closed so that the applied television signal is translated faithfully by the units 80 and 81 to the output terminals 31, 31. However, when the television signal includes transients of the type under consideration, the differentiating circuit 82 develops a control signal corresponding to a derivative of the transient for application to the switch-control circuit 83. The latter in turn is effective to open the electrical circuits of the electronic switch 81 for both positive- and negative-going transients, thereby effectively interrupting the translation therethrough of the signal applied to terminals 40, 40 to the output terminals 31, 31 for approximately the duration of the transients. After the transient interval, the electronic switch 81 returns to its normally closed state. Thus the signal-translating channel including units 80 and 81 normally has a substantially linear signal-translating characteristic, that is, it has such a characteristic for an applied television signal except for at least a portion of a transient appearing in the applied television signal. When the electronic switch 81 is opened because of the application of a transient to the differentiating circuit 82, the differentiating circuit 86 is simultaneously effective to produce a derivative signal for application as a keying signal to the transient signal generator 87. This signal causes the latter to generate a transient ordinarily much steeper than the transient applied to the terminals 40, 40 and to apply such transient to the amplitude modulator 88. The amplitude of the transient applied to the modulator effectively is modulated in amplitude in accordance with the amplitude of the derivative signal supplied by the differentiating circuit 86. The modified transient produced by modulator 88 is in turn applied to the output terminals 31, 31 of the system. Thus a very desirable transient is introduced into the signal-translating channel of the receiver. It will be apparent to one skilled in the art that, from the foregoing description of the Fig. 7 apparatus, the system of Fig. 7 is useful to insert substantially any desired form of transient in lieu of the original transient.

From the foregoing descriptions of the various embodiments of the invention, it will be apparent that the signal-translating systems in accordance with the present invention represent simple and inexpensive systems for modifying or reconstructing relatively sharp transients to produce therefrom much steeper transients. It will also be clear that a transient modifying signal-translating system embodying the present invention may be utilized in a television receiver to enable it to produce a very sharp picture. A television receiver employing a transient modifying signal-translating system in accordance with the invention is effective to reduce eye fatigue and other unpleasant reactions ordinarily experienced by some observers of television pictures. It will also be clear that a transient modifying signal-translating system embodying the present invention is particularly suited for use in a television receiver having a cathode-ray tube with a relatively large display area since the system is effective to improve the sharpness of reproduction of the picture produced by the receiver.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A transient modifying electrical signal-translating system for a television receiver for translating a television picture signal which may include unidirectional transients comprising: a television signal-translating channel normally having a substantially linear signal-translating characteristic for faithfully translating said picture signal; control circuit means coupled to said channel and effective to develop a control signal representative of a derivative of said transients of said picture signal; translating means having a controllable signal-translating characteristic coupled to said channel and said control circuit means; and a circuit coupled to said control circuit means and said translating means and responsive to said control signal for causing said translating means effectively to introduce a modifying signal into said channel to modify the signal translated thereby within a short interval after the initiation of said transients, whereby the output signal of said channel approximately corresponds to said picture signal with modified transients.

2. A transient modifying electrical signal-translating system for a television receiver for translating a television picture signal which may include unidirectional transients comprising: a television signal-translating channel normally having a substantially linear signal-translating characteristic for faithfully translating said picture signal; control circuit means coupled to said channel and effective to develop a control signal representative of a derivative of said transients exceeding a predetermined amplitude; translating means having a controllable signal-translating characteristic coupled to said channel and said control circuit means; and a circuit coupled to said control circuit means and said translating means and responsive to said control signal for causing said translating means effectively to introduce a modifying signal into said channel to modify the signal translated thereby within a short interval after the initiation of said transients, whereby the output signal of said channel approximately corresponds to said picture signal with modified transients.

3. A transient modifying electrical signal-translating system for a television receiver for translating a television picture signal which may include unidirectional relatively steep transients comprising: a television signal-translating channel for said signal having a uniform frequency-response characteristic over a frequency band substantially less than that of said signal so that the translation of said transients thereby tends to be impaired; control circuit means coupled to said channel and effective to develop a control signal representative of a derivative of said transients of said picture signal; translating means having a controllable signal-translating characteristic coupled to said channel and said control circuit means; and a circuit coupled to said control circuit means and said translating means and responsive to said control signal for causing said translating means effectively to introduce a modifying signal into said channel to modify the signal translated thereby within a short interval after the initiation of said transients, whereby the output signal of said channel approximately corresponds to said picture signal with modified transients which are much steeper than said first-mentioned transients.

4. A transient modifying electrical signal-translating system for a television receiver for translating a television picture signal which may include unidirectional transients comprising: a television signal-translating channel normally having a substantially linear signal-translating characteristic for faithfully translating said picture signal; differentiating means coupled to said channel for developing a first signal representative of the first derivative of said transients; rectifier means responsive to said first representative signal for developing therefrom a second signal representative of the absolute magnitude of said first derivative; and means coupled to said channel and responsive to said first and said second representative signals for effectively introducing into said channel a signal which is the product of a derivative of said transients and said second representative signal to modify the signal translated thereby within a short interval after the initiation of said transients, whereby the output signal of said channel approximately corresponds to said picture signal with modified transients.

5. A transient modifying electrical signal-translating system for a television receiver for translating a television picture signal which may include unidirectional transients comprising: a television signal-translating channel normally having a substantially linear signal-translating characteristic for faithfully translating said picture signal; a first differentiating means coupled to said channel for developing a first signal representative of the first derivative of said transients; rectifier means responsive to said first representative signal for developing therefrom a second signal representative of the absolute magnitude of said first derivative; a second differentiating means coupled to said first differentiating means for deriving the second derivative of said transients; and means coupled to said channel and responsive to said second derivative and said second representative signal for effectively introducing into said channel a signal which is the product of said second derivative and said second representative signal to modify the signal translated thereby within a short interval after the initiation of said transients, whereby the output signal of said channel approximately corresponds to said picture signal with modified transients.

6. A transient modifying electrical signal-translating system for a television receiver for translating a television picture signal which may include unidirectional transients comprising: a television signal-translating channel normally having a substantially linear signal-translating characteristic for faithfully translating said picture signal; a first differentiating means coupled to said channel for developing a first signal representative of the first derivative of said transients; rectifier means responsive to said first representative signal for developing therefrom a second signal representative of the absolute magnitude of said first derivative; a second differentiating means coupled to said first differentiating means for deriving the second derivative of said transients; and means, including an electron tube having a first pair of input electrodes coupled to said second differentiating means, a second pair of input electrodes coupled to said rectifier means and output electrodes coupled to said channel, responsive to said second derivative and said second representative signal for effectively introducing into said channel a signal which is the product of said second derivative and said second representative signal to modify the signal translated thereby within a short interval after the initiation of said transients, whereby the output signal of said channel approximately corresponds to said picture signal with modified transients.

7. A transient modifying electrical signal-translating system for a television receiver for translating a television picture signal which may include unidirectional transients comprising: a television signal-translating channel normally having a substantially linear signal-translating characteristic for faithfully translating said picture signal; control circuit means coupled to said channel and effective to develop a control signal representative of a derivative of said transients of said picture signal; means having a nonlinear signal-translating characteristic coupled to said channel and said control circuit means and responsive to said control signal for effectively introducing a signal into said channel to modify the signal translated thereby within a short interval after the initiation of said transients, whereby the output signal of said channel approximately corresponds to said picture signal with modified transients; and means coupled in circuit with said modifying means for preventing undesired oscillatory components of said control signal from being introduced into said channel by said modifying means.

8. A transient modifying electrical signal-translating system for a television receiver for translating a television picture signal which may include unidirectional transients comprising: a television signal-translating channel normally having a substantially linear signal-translating characteristic for faithfully translating said picture signal and having a gradual cutoff characteristic for effectively preventing undesired oscillatory components of said signal from being translated thereby; control circuit means coupled to said channel and effective to develop a control signal representative of a derivative of said transients of said picture signal; translating means having a controllable signal-translating characteristic coupled to said channel and said control circuit means; and a circuit coupled to said control circuit means and said translating means and responsive to said control signal for causing said translating means effectively to introduce a modifying signal into said channel to modify the signal translated thereby within a short interval after the initiation of said transient, whereby the output signal of said channel approximately corresponds to said picture signal with modified transients.

9. A transient modifying electrical signal-translating system for a television receiver for translating a television picture signal which may include unidirectional transients comprising: a television signal-translating channel normally having a substantially linear signal-translating characteristic for faithfully translating said picture signal; control circuit means coupled to said channel and effective to develop a control signal representative of a derivative of said transients of said picture signal; means having a nonlinear signal-translating characteristic and including an electron-discharge device having input electrodes coupled to said control circuit means and output electrodes coupled to said channel and responsive to said control signal for effectively introducing a signal into said channel to modify the signal translated thereby within a short interval after the initiation of said transients, whereby the output signal of said channel approximately corresponds to said picture signal with modified transients; and a cathode impedance network for said device, having parameters so proportioned that said device is degenerative with reference to a signal applied to said input electrodes, for preventing undesired oscillatory components of said applied signal from being introduced into said channel by said modifying means.

10. A transient modifying electrical signal-translating system for a television receiver for translating a television picture signal which may include unidirectional transients comprising: a television signal-translating channel normally having a substantially linear signal-translating characteristic for faithfully translating said picture signal; control circuit means coupled to said channel and effective to develop a control signal representative of a derivative of said transients of said picture signal; translating means coupled to said channel and said control circuit means and responsive to said control signal, having a controllable signal-translating characteristic; and a circuit coupled to said control circuit means and said translating means and responsive to said control signal for causing said translating means effectively to introduce into said channel within a short interval after the initiation of said transients a modifying signal of such magnitude and polarity as substantially to cancel said transients, whereby the output signal of said channel approximately corresponds to said picture signal but with transients much steeper than said first-mentioned transients.

11. A transient modifying electrical signal-translating system for a television receiver for translating a television picture signal which may include unidirectional transients comprising: a television signal-translating channel normally having a substantially linear signal-translating characteristic for faithfully translating said picture signal; a first differentiating means coupled to said channel for developing a control signal representative of the first derivative of said transients; an electron tube including a plurality of input electrodes and including output electrodes coupled to said channel; a second differentiating means coupled between said first differentiating means and one of said input electrodes; and rectifier means coupled between said first differentiating means and another of said input electrodes; said second differentiating means and said rectifier means being responsive to said control signal for developing therefrom a pair of control potentials for so controlling said tube as to introduce into said channel from said output electrodes a signal effective to modify the signal translated thereby within a short interval after the initiation of said transient, whereby the output signal of said channel approximately corresponds to said picture signal with modified transients.

12. A transient modifying electrical signal-translating system for a television receiver for translating a television picture signal which may include unidirectional transients comprising: a television signal-translating channel normally having a substantially linear signal-translating characteristic for faithfully translating said picture signal; a first differentiating means coupled to said channel for developing a control signal representative of the first derivative of said transients; an electron tube including a plurality of input electrodes and including output electrodes coupled to said channel; a second differentiating means coupled between said first differentiating means and one of said input electrodes; and full-wave rectifier means coupled between said first differentiating means and another of said input electrodes; said second differentiating means and said rectifier means being responsive to said control signal for developing therefrom signals representative of the second derivative of said transient and absolute magnitude of said first derivative, respectively; means for applying said signals representative of said second derivative and absolute magnitude to said input electrodes of said tube to introduce into said channel from said output electrodes a signal effective to modify the signal translated thereby within a short interval after the initiation of said transients, whereby the output signal of said channel approximately corresponds to said picture signal with modified transients.

13. A transient modifying electrical signal-translating system for a television receiver for translating a television picture signal which may include unidirectional transients comprising: a television signal-translating channel normally having a substantially linear signal-translating characteristic for faithfully translating said picture signal; a first differentiating means coupled to said channel for developing a control signal representative of the first derivative of said transient; an electron tube including a plurality of input electrodes and including a pair of output electrodes coupled to said channel; a second differentiating means coupled between said first differentiating means and one of said input electrodes; rectifier means coupled between said first differentiating means and another said input electrodes; said second differentiating means and said rectifier means being responsive to said control signal for developing therefrom a pair of control potentials for so controlling said tube as to introduce into said channel from said output electrodes a signal effective to modify the signal translated thereby within a short interval after the initiation of said transients, whereby the output signal of said channel approximately corresponds to said picture signal with modified transients; and a time-constant network coupled between said other of said input electrodes for developing from the signal applied to said input electrodes a bias potential effective to render said tube nonconductive for a short interval after said introduction into said channel of said signal from said output electrodes.

14. A transient modifying electrical signal-translating system for a television receiver for translating a television picture signal which may include unidirectional transients comprising: a television signal-translating channel normally having a substantially linear signal-translating characteristic for faithfully translating said picture signal; control circuit means comprising differentiating means coupled to said channel for developing a first signal representative of the first derivative of said transients; translating means comprising a repeater having a controllable signal-translating characteristic and coupled between said differentiating means and said channel and responsive to said first representative signal; and control means, coupled to said repeater and to said differentiating means, normally preventing the application of a signal by said repeater to said channel and responsive to said first representative signal within short intervals after the initiations of said transients that said repeater is caused during said intervals to introduce into said channel a modifying signal having such characteristics as substantially to cancel said transients, whereby the output signal of said channel approximately corresponds to said picture signal but with transients much steeper than said first-mentioned transients.

15. A transient modifying electrical signal-translating system for a television receiver for translating a television picture signal which may include unidirectional transients comprising: a television signal-translating channel normally having a substantially linear signal-translating characteristic for faithfully translating said picture signal; control circuit means comprising differentiating means coupled to said channel for developing a first signal representative of the first derivative of said transients; translating means comprising an electron-discharge repeater having a controllable signal-translating characteristic and responsive to said first derivative and having an input circuit coupled to said differentiating means and an output circuit including an integrating means coupled to said channel; control means coupled to said output circuit of said repeater for normally preventing the application of a signal by said repeater to said channel; rectifier means coupled between said differentiating means and said control means and responsive to said first representative signal for so controlling said control means within short intervals after the initiations of said transients that said repeater is caused during said intervals to introduce into said channel modifying signals having such characteristics as substantially to cancel said transients, whereby the output signal of said channel approximately corresponds to said picture signal but with transients much steeper than said first-mentioned transients.

16. A transient modifying electrical signal-translating system for a television receiver for translating a television picture signal which may include unidirectional transients comprising: a television signal-translating channel normally having a substantially linear signal-translating characteristic for an applied television signal; a first control circuit means coupled to said channel and effective to develop a first control signal representative of a derivative of said transients of said picture signal; means coupled to said first control circuit means responsive to said first control signal for modifying the signal-translating characteristic of said channel within a short interval after the initiation of said transients; a second control circuit means coupled to said channel and effective to develop a second control signal representative of a derivative of said transients of an applied signal; translating means having a controllable signal-translating characteristic coupled to said channel and said second control circuit means; and a circuit coupled to said second control circuit means and said translating means and responsive to said second control signal for causing said translating means effectively to introduce a modifying signal into said channel to modify the signal translated thereby within said short interval after the initiation of said transients, whereby the output signal of said channel approximately corresponds to said picture signal with modified transients.

17. A transient modifying electrical signal-translating system for a television receiver for translating a television picture signal which may include unidirectional relatively steep transients comprising: a television signal-translating channel normally having a substantially linear signal-translating characteristic for an applied television signal; a first control circuit means coupled to said channel and effective to develop a first control signal representative of a derivative of said transients of an applied signal; switching means in said channel coupled to said first control circuit means and responsive to said first control signal for modifying the signal-translating characteristic of said channel within a short interval after the initiation of said transients; control circuit means comprising differentiating means coupled to said channel and effective to develop a second control signal representative of a derivative of said transients of an applied signal; a circuit coupled to said differentiating means and responsive to said second control signal for developing a transient much steeper than said first-mentioned transient; and modulator means having a controllable signal-translating characteristic and coupled to said transient developing means and said channel and responsive to said second control signal and said developed transient for effectively introducing a modifying signal into said channel to modify the signal translated thereby within said short interval after the initiation of said transient, whereby the output signal of said channel approximately corresponds to said picture signal with modified transients.

References Cited in the file of this patent

UNITED STATES PATENTS

| Number | Name | Date |
|---|---|---|
| 1,315,539 | Carson | Sept. 9, 1919 |
| 2,243,599 | Herbst | May 27, 1941 |
| 2,271,876 | Seeley | Feb. 3, 1942 |
| 2,363,813 | Somers | Nov. 28, 1944 |
| 2,421,138 | Wheeler | May 27, 1947 |